(12) United States Patent
Schneyer et al.

(10) Patent No.: US 8,135,386 B2
(45) Date of Patent: Mar. 13, 2012

(54) METHOD AND APPARATUS FOR INSTANCE IDENTIFIER BASED ON A UNIQUE DEVICE IDENTIFIER

(75) Inventors: Sean Kendall Schneyer, The Colony, TX (US); Fredrik Lindholm, Alvsjo (SE); Alf Heidermark, Saltsjobaden (SE)

(73) Assignee: Telefoanktebolaget L M Ericsson (Publ), Stockholm (SE)

( * ) Notice: Subject to any disclaimer, the term of this patent is extended or adjusted under 35 U.S.C. 154(b) by 479 days.

(21) Appl. No.: 12/211,607

(22) Filed: Sep. 16, 2008

(65) Prior Publication Data

US 2010/0009681 A1    Jan. 14, 2010

Related U.S. Application Data

(60) Provisional application No. 61/079,293, filed on Jul. 9, 2008.

(51) Int. Cl.
*H04M 1/66* (2006.01)

(52) U.S. Cl. ........ 455/411; 370/254; 370/352; 370/328; 370/338; 455/435.1; 455/415; 455/445; 455/403; 713/150

(58) Field of Classification Search .................. 455/415, 455/445, 403
See application file for complete search history.

(56) References Cited

U.S. PATENT DOCUMENTS

| | | | |
|---|---|---|---|
| 6,928,066 B1 | 8/2005 | Moon et al. | |
| 6,996,087 B2 | 2/2006 | Ejzak | |
| 7,145,997 B2 | 12/2006 | Poikselka et al. | |
| 7,701,974 B2 | 4/2010 | Mayer et al. | |
| 7,738,894 B2 | 6/2010 | Sung et al. | |
| 7,746,836 B2 * | 6/2010 | Jentz et al. ..................... 370/338 |
| 7,760,712 B2 * | 7/2010 | Buckley ........................ 370/353 |
| 7,870,196 B2 | 1/2011 | Costa Requena | |
| 2008/0194223 A1 | 8/2008 | Overby | |

OTHER PUBLICATIONS

"A Universally Unique Identifier (UUID) URN Namespace", IETF RFC 4122, Jul. 2005.*
"Obtaining and Using Globally Routable User Agent (US) URIs(GRUU) in the Session Initiation Protocol (SIP)"; draft-ietf-sip-gruu-15 (Oct. 2007).
"Managing Client Initiated Connections in the Session Initiation Protocol (SIP)"; draft-ietf-sip-outbound-15 (Jun. 2008).
"A Universally Unique Identifier (UUID) URN Namespace"; IETF RFC 4122 (Jul. 2005).
"The Network Access Identifier"; IETF RFC 4282 (Dec. 2005).
"International Mobile Station Equipment Identities (IMEI)"; 3GPP TS 22.016.
"Numbering, addressing and identification"; 3GPP TS 23.003.
"3G Mobile Equipment Identifier (MEID), Stage 1"; 3GPP2 S.R0048-A.
"IP Multimedia (IM) Core Network (CN) subsystem Centralized Services (ICS); Stage 3"; 3GPP TS 24.292.
Jennings Cisco Systems C et al: "Instance Identifiers for SIP User Agents; draft-jennings-sipping-inst ance-id-01.txt" IETF Standard-Working-Draft, Internet Engineering Task Force, IETF, CH, No. 1, Jul. 13, 2005 , XP015040577 ISSN: 0000-0004 chapters 2, 3, 4.

(Continued)

*Primary Examiner* — Charles Appiah
*Assistant Examiner* — Randy Peaches

(57) ABSTRACT

A method and apparatus for use in a communications network whereby an Instance Identifier (ID) is created to uniquely identify a device such as a mobile device or User Equipment (UE) in the communications network.

21 Claims, 6 Drawing Sheets

OTHER PUBLICATIONS

Henry, M Intel Corp: "DHCP Options for Host System Characteristics; draft-dittert-host-sys-char-03.txt" IETF Standard-Working-Draft, Internet Engineering Task Force, IETF, CH, No. 3, Feb. 22, 1999, XP015012481 ISSN: 0000-0004 chapter 3.0.

Leach Microsoft Mmealling Refactored Networks P et al: "A Universally Unique Identifier (UUID) URN Namespace; rfc4122.txt" IETF Standard, Internet Engineering Task Force, IETF, CH, Jul. 1, 2005, XP015041880 ISSN: 0000-0003.

* cited by examiner

```
    The formal definition of the UUID string
representation is provided by the following ABNF:

UUID                      = time-low "-" time-mid
"-"
                                    time-high-and-version
"-"
                                    clock-seq-and-reserved
                                    clock-seq-low "-" node
        time-low                  = 4hexOctet
        time-mid                  = 2hexOctet
        time-high-and-version     = 2hexOctet
        clock-seq-and-reserved    = hexOctet
        clock-seq-low             = hexOctet
        node                      = 6hexOctet
        hexOctet                  = hexDigit hexDigit
        hexDigit =
               "0" / "1" / "2" / "3" / "4" / "5" / "6" /
"7" / "8" / "9" /
                    "a" / "b" / "c" / "d" / "e" / "f" /
                    "A" / "B" / "C" / "D" / "E" / "F"

The following is an example of the string
representation of a UUID as a URN:

urn:uuid:f81d4fae-7dec-11d0-a765-00a0c91e6bf6
```

FIGURE 1

```
    /* Name string is an IMEI or other device ID*/
        uuid_t NameSpace_DeviceID = { /* efcf4930-4caf-11dd-ae16-
0800200c9a66 */
            0xefcf4930,
            0x4caf,
            0x11dd,
            0xae, 0x16, 0x08, 0x00, 0x20, 0x0c, 0x9a, 0x66
    };
```

FIGURE 2

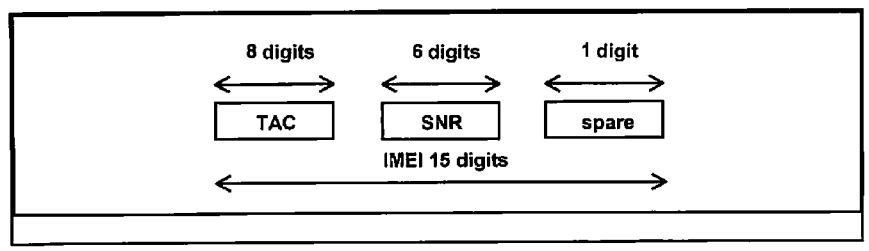
FIGURE 3
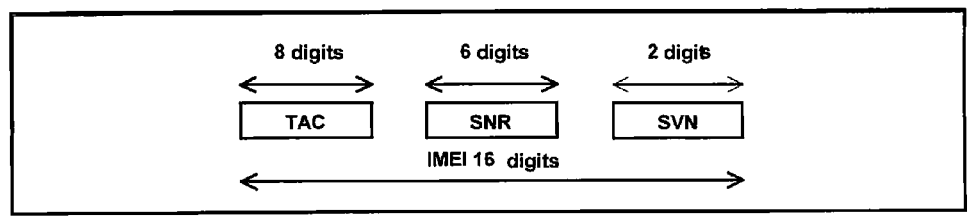
FIGURE 4
| TAC | | | | | | | Serial Number | | | | | | |
|---|---|---|---|---|---|---|---|---|---|---|---|---|---|
| N | N | T | T | T | T | T | F | F | Z | Z | Z | Z | Z | Z | CD |
FIGURE 5

```
    REGISTER sip:user1_public1@home1.net SIP/2.0
    Via: SIP/2.0/UDP
[5555::aaa:bbb:ccc:ddd];branch=z9hG4bKnashds7
    Max-Forwards: 70
    From: <sip:user1_public1@home1.net>;tag=4fa3
    To: <sip:user1_public1@home1.net>
    Contact:
<sip:[5555::aaa:bbb:ccc:ddd]>;expires=600000;+sip.instanc
e="<urn:uuid:721c5fce-7fd8-63cc-1a99-
9df549a58778>";+g.3gpp.icsi_ref="urn%3Aurn-xxx%3gpp-
service.ims.icsi.mmtel"
    Call-ID: apb03a0s09dkjdfglkj49111
    CSeq: 1 REGISTER
    Supported: path, gruu
    Content-Length: 0
```

FIGURE 7

```
    REGISTER sip: ics.mnc015.mcc234.3gppnetwork.org
SIP/2.0
    Via: SIP/2.0/UDP
[5555::aaa:bbb:ccc:ddd];branch=z9hG4bKnashds7
    Max-Forwards: 70
    From:
<sip:234150999999999@ics.mnc015.mcc234.3gppnetwork.org>;ta
g=4fa3
    To:
<sip:234150999999999@ics.mnc015.mcc234.3gppnetwork.org>
    Contact:
<sip:[5555::aaa:bbb:ccc:ddd]>;expires=600000;+sip.instance
="<urn:uuid:721c5fce-7fd8-63cc-1a99-
9df549a58778>";+g.3gpp.icsi_ref="urn%3Aurn-xxx%3gpp-
service.ims.icsi.mmtel"
    Call-ID: apb03a0s09dkjdfglkj49111
    CSeq: 1 REGISTER
    Supported: path, gruu
    Content-Length: 0
```

Figure 9

METHOD AND APPARATUS FOR INSTANCE IDENTIFIER BASED ON A UNIQUE DEVICE IDENTIFIER

CROSS-REFERENCE TO RELATED APPLICATIONS

This application claims the benefit of U.S. Provisional Application No. 61/079,293, filed Jul. 9, 2008, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to SIP based communication and data systems. The abbreviations used herein shall have the following meanings:
CS: Circuit Switched
CSCF: Call Session Control Function
DevID: Device Identifier
ESN: Electronic Serial Number
GRUU: Globally Routable User Agent (UA) URIs
HSS: Home Subscriber Server
I-CSCF: Interrogating CSCF
ICS: IMS Centralized Services
ID: Identifier
IMEI: International Mobile Equipment Identity
IMS: IP Multimedia Subsystem
IP: Internet Protocol
MEID: Mobile Equipment Identifier
MSC: Mobile Switching Center
NAI: Network Access Identifier
P-CSCF: Proxy CSCF
PS: Packet Switched
S-CSCF: Serving CSCF
SCC AS: Service Centralization and Continuity Application Server
SIP: Session Initiation Protocol
SNR: Serial Number
TAC: Type Allocation Code
UA: User Agent
UE: User Equipment
URI: Uniform Resource Identifiers
URN: Uniform Resource Name
UUID: Universally Unique Identifier In SIP-based systems, such as IMS, it would be advantageous to be able to target a request to a specific device, such as a mobile device, fixed line device, or an instance of a software based client. A software based client is not directly tied to a specific physical device and may execute on top of any suitable platform such as a personal computer or advanced mobile device. For example, when transferring a call, one may wish to target a specific device such as a user's mobile device.

In order to achieve this objective, a Globally Routable User Agent (UA) URN (GRUU) is assigned to the mobile device by the registrar (which is the S-CSCF in an IMS system). In order to properly assign the GRUU, the registrar uses an Instance ID that is provided by the mobile device during registration.

Current specifications assume that the device being targeted with the GRUU will always be the one that is performing the registration. However, with the introduction of IMS Centralized Services (ICS), it is possible that the network will register (in IMS) on behalf of the device when the device is using circuit-switched (CS) access. In the case of ICS, the MSC Server is the network entity that registers on behalf of the CS subscriber.

Since an ICS device may also be able to register directly (in IMS) when it is using packet-switched (PS) access, it is desirable that the Instance ID that is used by the network be identical to the Instance ID that is used by the device when performing registration. This will ensure that the same GRUU is assigned to the device.

The current IMS specifications (such as 24.229) do not provide any specific guidance on how the device or the network are to create the Instance ID. The only guidance that is provided is that the Instance ID must match the format described in the IETF Outbound draft. Therefore, the current specifications do not ensure that the Instance ID used by the network will match the Instance ID used by the device.

A possible Instance ID would be to directly use an existing equipment identity from the device or terminal, such as the IMEI. Disadvantageously, this identity will be carried in plain text in signaling that will be transported to both the network and end user devices. Exposing the equipment identity in this way could be considered a privacy violation since it reveals information that can be correlated back to the end user. Additionally, the exposure of the equipment identity poses a security risk since this information could be used to clone the equipment. Therefore, directly using an existing device identity such as the IMEI is problematic from a privacy and security point of view. The present invention provides an alternative solution.

It would be advantageous to have a method and apparatus for an instance ID based in a unique device identifier that overcomes the disadvantages of the prior art. The present invention provides such a method and apparatus.

BRIEF SUMMARY OF THE INVENTION

In one embodiment, the present invention is a method for creating Instance IDs that ensures that the Instance IDs are consistent whether they are created by the device or by the network. At the same time, the invention protects the user's privacy. To ensure consistency, the creation of the Instance ID is based on the following principles:
 Use of a unique identifier that belongs to the device but is also known to the network (referred to herein as a DevID);
 Use of a hash to protect the DevID; and
 Use of a shared namespace that is used by both the network and the device when encoding the DevID into an Instance ID.

BRIEF DESCRIPTION OF THE SEVERAL VIEWS OF THE DRAWING

In the following section, the invention will be described with reference to exemplary embodiments illustrated in the figures, in which:
FIG. 1 is a Table 100 showing a UUID String Representation;
FIG. 2 is a Table 200 showing a Name space definition for IMEI or other device ID based UUID creation;
FIG. 3 illustrates the elements of an IMEI structure 300;

FIG. 4 illustrates the elements of an IMEISV structure 400;

FIG. 5 illustrates the elements of an MEID structure 500

FIG. 7 is a message header 700 showing an example REGISTER with Instance ID (sip.instance);

FIG. 9 is a message header 900 illustrating the Example REGISTER with and Instance ID (sip.instance).

DETAILED DESCRIPTION OF THE INVENTION

Figure 6:
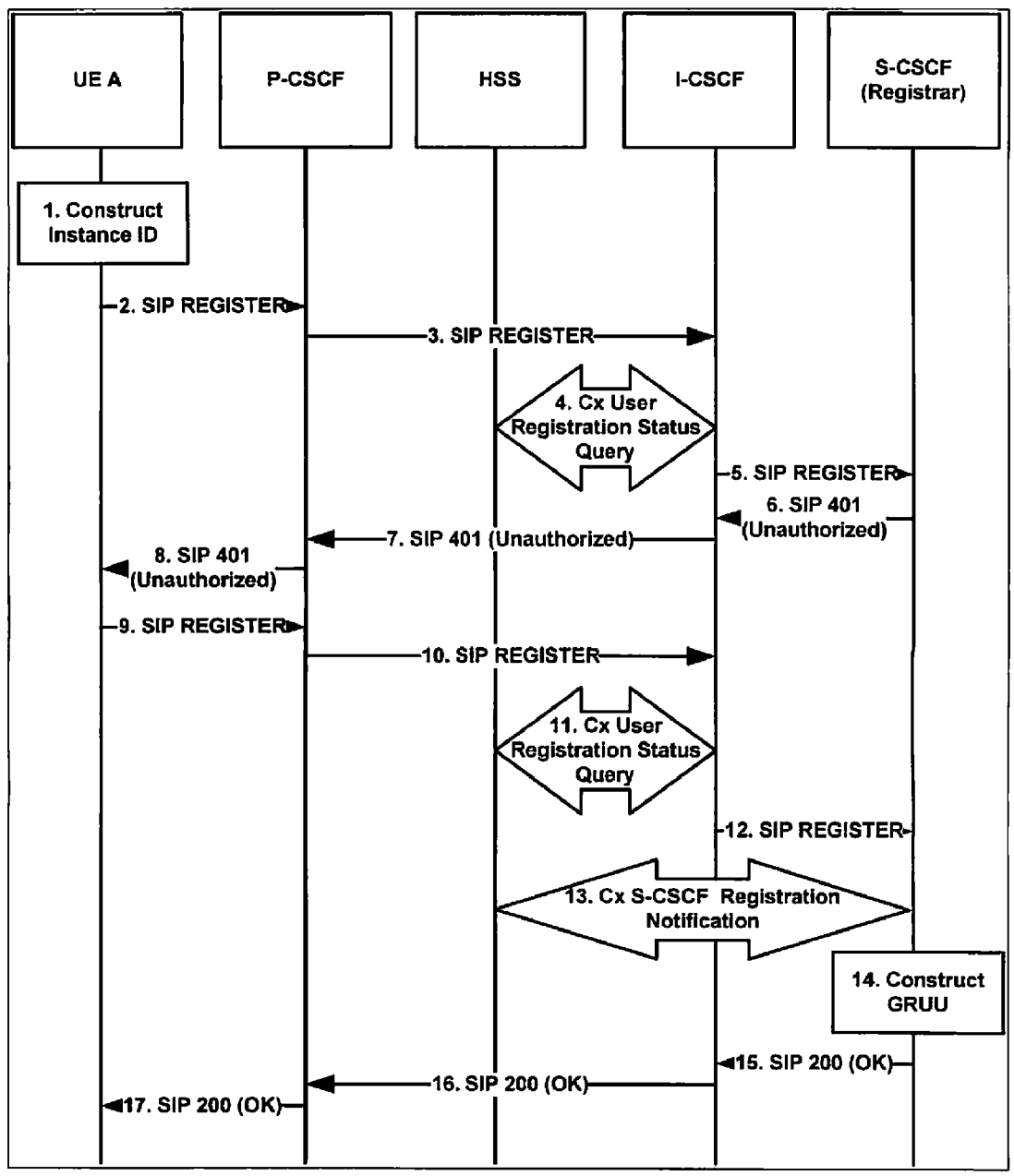
FIG. 6 is a messaging diagram 600 illustrating device registration

The embodiment described herein provides specific details for the creation of an Instance ID that ensures uniqueness of the ID, while ensuring the privacy of the existing equipment identities. The present invention also provides a mechanism to ensure that the network (e.g., an MSC Server) and the device create identical Instance IDs that are used in the creation of a GRUU. In one embodiment, the present invention makes use of the UUID format defined in RFC 4122.

The device described with respect to an embodiment of the present invention is assumed to be a 3GPP mobile device that supports GRUU and the creation of an Instance ID. However the present invention is applicable to any device where the network and the device share knowledge of a device-specific identifier. In the case of a 3GPP compliant mobile device, the DevID may be derived from the IMEI. For a 3GPP2 compliant device, the DevID may be derived from the MEID or ESN.

For soft clients, and clients not fully conforming to the mobile standards, the IMEI (or equivalent) might not be available. Hence, in another embodiment of the invention, the DevID is created based on the private user identity of the terminal. In such a scenario, a device may be represented by several private user identities towards the registrar such as one from the UE as such over the PS access, and one from the MSC server registering on behalf of the user. To ensure a consistent behavior, both the UE and the network performing the registration select the DevID based on the private ID used by the network. An advantage of using the private ID from the network as the DevID is that it becomes agnostic to the type of CS access used.

The method for Instance ID creation according to a first embodiment of the present invention is as follows:

In this embodiment, the name-based version of the UUID is used as described in RFC 4122. Either version 3 or version 5 can be used; the only difference is the type of hashing that is used (MD5 and SHA-1, respectively).

As seen in Table 100 of FIG. 1, the Instance ID is constructed as a UUID URI using the string representation of a UUID as described in RFC 4122.

In order to create the final Instance ID, a name space ID is required. Table 200 of FIG. 2 provides the definition of a name space that is used as an example in this embodiment.

The following method is utilized for creating an Instance ID using a device specific ID, in this example using the IMEI as defined in 3GPP:

Choose a hash algorithm (MD5 or SHA-1); for this example, MD5. The network and the device must use the same hash algorithm;

Create a DevID by extracting the TAC and SNR from the IMEI. An IMEI structure 300 is illustrated in FIG. 3. The TAC and SNR are used and the spare digit is omitted for a total of 14 digits used. By omitting the spare digit, this technique is also applicable to the IMEISV where the SVN is omitted as seen in seen in FIG. 4. In the case of non-3GPP devices where something other than IMEI is used, the only criteria for the DevID is that it is unique to the device and is also known by the network;

Place the name space ID (the name space ID is defined in Table 200 of FIG. 2) and DevID in network byte order;

Concatenate the name space ID and DevID;

Compute the hash of the concatenated string using the pre-selected hash algorithm;

Set the UUID fields as specified in RFC 4122 sub-clause 4.3 using the hash as computed above and create the string representation as show in clause 3 of the RFC; and Place the string representation in urn form by pre-pending "urn:uuid" to the above string. Example: urn:uuid:3647f493-4948-abe2-6599-7c295ab29804.

This UUID URN is the Instance ID to be used for this device and by the network when registering on behalf of this device.

Unique Device Identifiers can be developed based on the various standardization forums.

In 3GPP, the IMEI is composed of the following elements (each element shall consist of decimal digits only):

Type Allocation Code (TAC). Its length is 8 digits;

Serial Number (SNR) is an individual serial number uniquely identifying each equipment within the TAC. Its length is 6 digits; and Spare digit (check digit): This digit is used as a Luhn checksum digit and is not transmitted with the IMEI.

The IMEI (14 digits) is complemented by a check digit. The check digit is not part of the digits transmitted.

An example DevID derivation is as follows:

3GPP IMEI:

TAC: 35196500

SNR: 718917

Check Digit: 7

DevID=TAC+SNR=35196500718917

The IMEISV is composed of the following elements (each element shall consist of decimal digits only):

Type Allocation Code (TAC). Its length is 8 digits;

Serial Number (SNR) is an individual serial number uniquely identifying each equipment within each TAC. Its length is 6 digits;

Software Version Number (SVN) identifies the software version number of the mobile equipment. Its length is 2 digits.

An example DevID derivation is as follows:

3GPP EMEISV:

TAC: 35196500

SNR: 718917

SVN: 04

DevID=TAC+SNR=35196500718917

In 3GPP2, for the MEID, all of these fields are defined as hexadecimal values with the following valid range.

NN—valid range A0-FF—globally administered

TTTTTT—valid range 000000-FFFFFF

ZZZZZZ—valid range 000000-FFFFFF

CD—valid range 0. F—The Check Digit (CD) is not part of the MEID and is not transmitted when the MEID is transmitted.

An example DevID derivation is as follows:

3GPP2 MEID:

TAC: A1000000

SNR: 3F0D50

CD:

DevID=TAC+SNR=A10000003F0D50

Additional Identifier alternative can be generated for devices without unique device IDs.

In an embodiment of a Private ID solution (access agnostic), there may not be a device specific ID, such as an IMEI, available to the client. This would be the case when using a soft client, for example. In this case, the private identity can be used instead.

The private identity takes the form of a Network Access Identifier (NAI) as defined in RFC 4282. An example private identity for IMS is: user1_private@home1.net.

Figure 8:
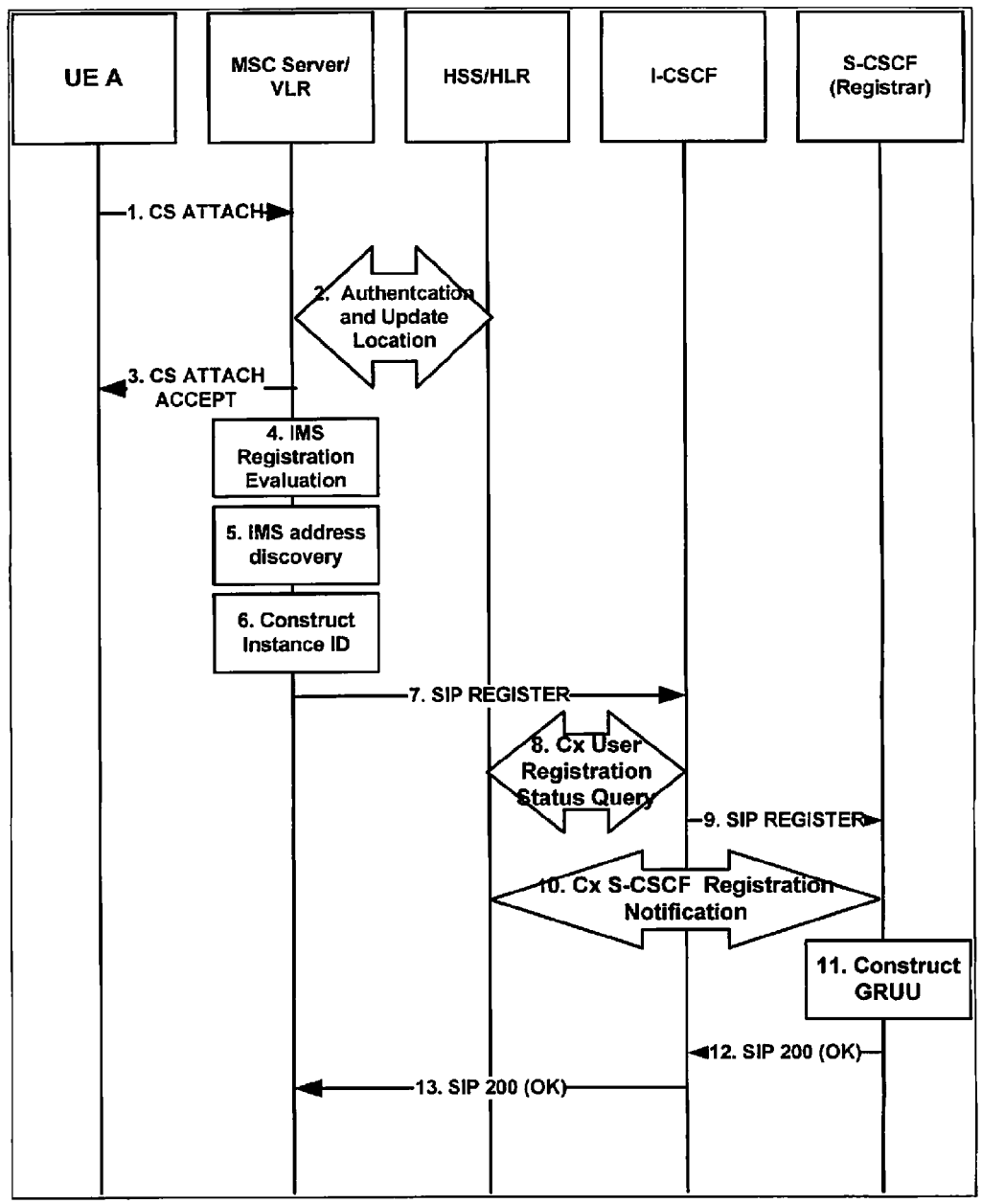
FIG. 8 is a messaging diagram 800 illustrating the messages/commands occurring during network registration on behalf of a CS UE.

An example DevID derivation is as follows:
Private ID:
Private ID: user1_private@home1.net
DevID=Private ID=user1_private@home1.net FIGS. 6 and 8 illustrate call flows using the method of the present invention. These example call flows show an IMS-based network architecture, however, the present invention also applies to non-IMS architectures as well.

FIG. 6 illustrates a call flow 600 when the mobile device registers itself directly in IMS (towards the registrar) using PS access. Referring now to FIG. 6, the basic registration flow in an exemplary embodiment of the present invention is shown. As seen therein, the signaling flow is as follows:

1. Construct Instance ID: UE A creates an Instance ID derived from its IMEI as described herein;
2. REGISTER request (UE A to P-CSCF): (as seen in FIG. 7);
3. REGISTER request (P-CSCF to I-CSCF): The P-CSCF forwards the request to the I-CSCF;
4. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF;
5. REGISTER request (I-CSCF to S-CSCF): I-CSCF forwards the REGISTER request to the selected S-CSCF;
6. 401 (Unauthorized) (S-CSCF to I-CSCF): The S-CSCF challenges the registration request;
7. 401 (Unauthorized) (I-CSCF to P-CSCF): The I-CSCF forwards the response to the P-CSCF;
8. 401 (Unauthorized) (P-CSCF to UE A): The P-CSCF forwards the response to UE A;
9. REGISTER request (UE A to P-CSCF): UE A resends the REGISTER request (referred to in step 2), this time with authentication credentials;
10. REGISTER request (P-CSCF to I-CSCF): The P-CSCF forwards the request to the I-CSCF;
11. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF;
12. REGISTER request (I-CSCF to S-CSCF): I-CSCF forwards the REGISTER request to the selected S-CSCF;
13. Cx: S-CSCF Registration Notification: The S-CSCF informs the HSS that the user has been registered. Upon being requested by the S-CSCF, the HSS will also include the user profile in the response sent to the S-CSCF;
14. Construct GRUU: The S-CSCF (acting as the registrar) constructs a GRUU based on the Instance ID that was created in step 1. The GRUU is constructed as defined in draft-ietf-sip-gruu;
15. 200 (OK) (S-CSCF to I-CSCF): The S-CSCF sends a 200 (OK) response to the I-CSCF indicating that Registration was successful. The 200 (OK) response includes the GRUU that was created in the previous step;
16. 200 (OK) (I-CSCF to P-CSCF): The I-CSCF forwards the 200 (OK) response to the P-CSCF indicating that Registration was successful; and
17. 200 (OK) (P-CSCF to UE A): The P-CSCF forwards the 200 (OK) response to UE A indicating that Registration was successful.

FIG. 8 illustrates a call flow 800 when the network registers on behalf of a device that is using CS access. The functionality of the present invention improves the flow described in 3GPP TS 24.292:

1. CS attach (UE A to MSC);
2. Authentication and Update Location (MSC/VLR to HLR/HSS);
3. CS attach accept (MSC to UE A);
4. IMS Registration evaluation: The MSC Server evaluates whether it needs to perform registration with IMS. This can be based on subscriber data received from the HSS/HLR;
5. IMS address discovery: The MSC Server derives a home network domain name. The home network domain is used to perform DNS queries to locate the I-CSCF in the home network;
6. Construct Instance ID: The MSC Server creates an Instance ID derived from the IMEI of UE A as described in this invention;
7. REGISTER request (MSC Server to I-CSCF): The purpose of this request is to register a private user identity and a temporary public user identity derived for this subscriber on behalf of the user with a S-CSCF in the home network. This request is routed to the I-CSCF in the home network;
8. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF;
9. REGISTER request (I-CSCF to S-CSCF): I-CSCF forwards the REGISTER request to the selected S-CSCF;
10. Cx: S-CSCF Registration Notification: The S-CSCF informs the HSS that the user has been registered. Upon being requested by the S-CSCF, the HSS will also include the user profile in the response sent to the S-CSCF;
11. Construct GRUU: The S-CSCF, acting as the registrar, constructs a GRUU based on the Instance ID that was created in step 6. The GRUU is constructed as defined in draft-ietf-sip-gruu. Because this Instance ID used was the same that the device would have generated, the GRUU that is created will also be identical to one that would be returned to a device registering directly;
12. 200 (OK) (S-CSCF to I-CSCF): The S-CSCF sends a 200 (OK) response to the I-CSCF indicating that Registration was successful. The 200 (OK) response includes the GRUU that was created in the previous step; and
13. 200 (OK) (I-CSCF to MSC Server): The I-CSCF forwards the 200 (OK) response to the MSC Server indicating that Registration was successful.

The present invention has numerous advantages. It ensures that any Instance ID created by a network will be identical to an Instance ID created by the device. This, in turn, results in the same GRUU being defined regardless of how the device was registered (directly or by the network). The present invention provides specific steps to outline the creation of the Instance ID, particularly in the case of an IMS system. In this manner, it fills a gap in the existing 3GPP specifications. The present invention thus ensures consistent behavior for IMS-based services such as ICS. Further, the use of a hash to derive the Instance ID protects the device specific identifier, such as the IMEI and MEID, which in turn protects the integrity of this device specific identifier, thus enhancing security.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method for use in a communications network, comprising:
    creating an Instance Identifier (ID) to uniquely identify a device such as a mobile device or User Equipment (UE) in the communications network, wherein
    the Instance Identifier (ID) is constructed as a Universally Unique Identifier (UUID) Uniform Resource Name (URN) using a string representation of a UUID, and
    the creating the Instance Identifier (ID) further comprises
        creating a device ID (DevID), wherein the creating the DevID further comprises
            extracting a Type Allocation Code (TAC) and a Serial Number (SNR) from an International Mobile Equipment Identity (IMEI), wherein
                when using the TAC and SNR, omitting a spare digit for a total of 14 digits,
            placing a name space ID and DevID in network byte order,
            concatenating the name space ID and DevID,
            computing a hash of the concatenated name space ID and DevID using a pre-selected hash algorithm,
            setting the UUID using the hash,
            creating the string representation of the UUID, and
            placing the string representation in URN form by prepending "urn:uuid" to the string representation.

2. The method of claim 1, wherein the mobile device is compliant with the 3GPP standards and supports Globally Routable User Agent (GRUU).

3. The method of claim 1, wherein the mobile device is compliant with the Third Generation Partnership Project 2 (3GPP2) standards.

4. The method of claim 3, wherein the unique identifier that belongs to the mobile device and is known to the network (DevID) is derived from the Mobile Equipment Identifier (MEID) or Electronic Serial Number (ESN).

5. The method of claim 1, wherein the Instance ID created by the network is identical to an Instance ID created by the device.

6. The method of claim 1, for use in a non-3GPP device, and wherein the DevID is unique to the device and is known by the network.

7. The method of claim 1, further comprising using a private identity to create the Instance ID.

8. The method of claim 7, wherein the private identity is a Network Access Identifier (NAI).

9. The method of claim 1, further comprising the steps of:
    constructing, by a User Equipment (UE), an Instance ID derived from an IMEI;
    performing a REGISTER request from a UE to a Proxy-Call Session Control Function (P-CSCF);
    forwarding, by the P-CSCF, the request to the Interrogating-Call Session Control Function (I-CSCF);
    making, by the I-CSCF, a request for information related to the Subscriber registration status by sending the private user identity, public user identity and visited domain name to a Home Subscriber Server (HSS);
    returning, by the HSS, the Serving-Call Session Control Function (S-CSCF) required capabilities to the I-CSCF;
    using, by the I-CSCF, the S-CSCF required capabilities information to select a suitable S-CSCF;
    forwarding, by the I-CSCF, the REGISTER request to the selected S-CSCF;
    challenging, by the S-CSCF, the registration request;
    forwarding, by the I-CSCF, the response to the P-CSCF;
    forwarding, by the P-CSCF, the response to the UE;
    resending, by the UE, the REGISTER request with authentication credentials;
    forwarding, by the P-CSCF, the request to the I-CSCF;
    making, by the I-CSCF, a request for information related to the Subscriber registration status by sending the private user identity, public user identity and visited domain name to an HSS;
    returning, by the HSS the S-CSCF required capabilities;
    using, by the I-CSCF, the information about the S-CSCF required capabilities to select a suitable S-CSCF;
    forwarding, by the I-CSCF, the REGISTER request to the selected S-CSCF;
    informing, by the S-CSCF, the HSS that the user has been registered;
    including, upon being requested by the S-CSCF, by the HSS the user profile in the response sent to the S-CSCF;
    constructing, by the S-CSCF acting as registrar, a Globally Routable User Agent (GRUU) based on the Instance ID;
    sending, by the S-CSCF sends a 200 (OK) response, including the GRUU, to the I-CSCF indicating that registration was successful;
    forwarding, by the I-CSCF, the 200 (OK) response to the P-CSCF indicating that registration was successful; and
    forwarding, by the P-CSCF, the 200 (OK) response to UE indicating that registration was successful.

10. The method of claim 1, for use when the communication network registers on behalf of a device that is using circuit switch (CS) access.

11. The method of claim 10, further comprising the steps of;
    circuit switch attaching by a UE to a Mobile Switching Center (MSC);
    performing, by a Mobile Switching Center/Visitor Location Register (MSC/VLR) to a Home Location Register/Home Subscriber Server (HLR/HSS) an Authentication and Update Location;
    accepting, by the MSC to the UE a CS attach;
    evaluating, by the MSC, whether it needs to perform registration with IMS;
    deriving, by the MSC, a home network domain name;
    creating, by the MSC, an Instance ID derived from the IMEI of UE;
    sending, by the MSC to the Interrogating-Call Session Control Function (I-CSCF), a REGISTER request to register a private user identity and a temporary public user identity derived for the subscriber on behalf of the user with a Serving-Call Session Control Function (S-CSCF) in the home network;
    routing the request to the I-CSCF in the home network;
    requesting, by the I-CSCF, a request for information related to the Subscriber registration status by sending the private user identity, public user identity and visited domain name to an HSS;
    returning, by the HSS, the S-CSCF required capabilities;
    using, by the I-CSCF the S-CSCF required capabilities to select a suitable S-CSCF;
    forwarding, by the I-CSCF, the REGISTER request to the selected S-CSCF;
    informing, by the S-CSCF, the HSS that the user has been registered, whereby, upon being requested by the S-CSCF, the HSS will also include the user profile in the response sent to the S-CSCF;
    constructing, by the S-CSCF acting as registrar, a GRUU based on the Instance ID;

sending, by the S-CSCF, a 200 (OK) response, including the GRUU, to the I-CSCF indicating that registration was successful; and forwarding, by the I-CSCF, the 200 (OK) response to the MSC Server indicating that registration was successful.

12. An apparatus for use in a communications network, comprising:
 means for creating an Instance Identifier (ID) to uniquely identify a device such as a mobile device or User Equipment (UE) in the communications network, wherein
 the Instance Identifier (ID) is constructed as a Universally Unique Identifier (UUID) Uniform Resource Name (URN) using a string representation of a UUID, and
 the means for creating the Instance Identifier (ID) further comprises
  means for creating a device ID (DevID), wherein the creating the DevID further comprises
   means for extracting a Type Allocation Code (TAC) and a Serial Number (SNR) from an International Mobile Equipment Identity (IMEI), wherein
    wherein using the TAR and SNR, omitting a spare digit for a total of 14 digits,
   means for placing a name space ID and DevID in network byte order
   means for concatenating the name space ID and DevID,
   means for computing a hash of the concatenated name space ID and DevID using a pre-selected hash algorithm,
   means for setting the UUID using the hash,
   means for creating the string representation of the UUID, and
   means for placing the string representation in URN form by pre-pending "urn:uuid" to the string representation.

13. The apparatus of claim 12, wherein the mobile device is compliant with the 3GPP standards and supports Globally Routable User Agent (GRUU).

14. The apparatus of claim 12, wherein the mobile device is compliant with the 3GPP2 standards.

15. The apparatus of claim 14, wherein the unique identifier that belongs to the mobile device and is known to the network (DevID) is derived from the MEID or ESN.

16. The apparatus of claim 12, wherein the Instance ID created by the network is identical to an Instance ID created by the device.

17. The apparatus of claim 12, for use in a non-3GPP device, and wherein the DevID is unique to the device and is known by the network.

18. The apparatus of claim 12, further comprising using a private identity to create the Instance ID.

19. The apparatus of claim 18, wherein the private identity is a Network Access Identifier (NAI).

20. The apparatus of claim 15, for use when the communication network registers on behalf of a device that is using circuit switch (CS) access.

21. A non-transitory computer-readable storage medium further comprising computer-readable instructions, wherein the computer-readable instructions, when executed by a processor, are configured to:
 create an Instance Identifier (ID) to uniquely identify a device such as a mobile device or User Equipment (UE) in the communications network, wherein
 the Instance Identifier (ID) is constructed as a Universally Unique Identifier (UUID) Uniform Resource Name (URN) using a string representation of a UUID, and
 creating the Instance Identifier (ID) further comprises
  create a device ID (DevID), wherein the creating the DevID further comprises
   extract a Type Allocation Code (TAC) and a Serial Number (SNR) from an International Mobile Equipment Identity (IMEI), wherein
    when using the TAC and SNR, omitting a spare digit for a total of 14 digits,
  place a name space ID and DevID in network byte order,
  concatenate the name space ID and DevID,
  compute a hash of the concatenated name space ID and DevID using a
 pre-selected hash algorithm,
  set the UUID using the hash,
  create the string representation of the UUID, and
  place the string representation in URN form by pre-pending "urn:uuid" to the string representation.

* * * * *

UNITED STATES PATENT AND TRADEMARK OFFICE
CERTIFICATE OF CORRECTION

| | |
|---|---|
| PATENT NO. | : 8,135,386 B2 |
| APPLICATION NO. | : 12/211607 |
| DATED | : March 13, 2012 |
| INVENTOR(S) | : Schneyer et al. |

Page 1 of 1

It is certified that error appears in the above-identified patent and that said Letters Patent is hereby corrected as shown below:

On the Title page:
Item (73), under "Assignee", in Column 1, Line 1, delete "Telefoanktebolaget" and insert -- Telefonaktiebolaget --, therefor.

Item (56), under "OTHER PUBLICATIONS", in Column 2, Line 19, delete "inst ance" and insert -- instance --, therefor.

In the Drawings:
In Fig. 8, Sheet 5 of 6, for Point "2.", in Line 1, delete "Authentcation" and insert -- Authentication --, therefor.

In the Specifications:
In Column 2, Line 58, delete "DRAWING" and insert -- DRAWINGS --, therefor.

In the Claims:
In Column 8, Line 33, in Claim 11, delete "of;" and insert -- of: --, therefor.

In Column 8, Line 58, in Claim 11, delete "I-CSCF the" and insert -- I-CSCF, the --, therefor.

In Column 9, Line 21, in Claim 12, delete "wherein using" and insert -- when using --, therefor.

In Column 9, Line 24, in Claim 12, delete "order" and insert -- order, --, therefor.

Signed and Sealed this
Third Day of July, 2012

David J. Kappos
*Director of the United States Patent and Trademark Office*